United States Patent
Yeh et al.

(10) Patent No.: US 7,558,431 B2
(45) Date of Patent: Jul. 7, 2009

(54) METHOD AND SYSTEM FOR DISCRETE COSINE TRANSFORMS/INVERSE DISCRETE COSINE TRANSFORMS BASED ON PIPELINE ARCHITECTURE

(75) Inventors: Ting-Kun Yeh, Taipei (TW); Roy Wang, Taipei (TW); Roger Lin, Taipei (TW); David Wang, Taipei (TW)

(73) Assignee: Via Technologies, Inc., Taipei (TW)

(*) Notice: Subject to any disclaimer, the term of this patent is extended or adjusted under 35 U.S.C. 154(b) by 680 days.

(21) Appl. No.: 11/000,885

(22) Filed: Dec. 2, 2004

(65) Prior Publication Data

US 2005/0125469 A1    Jun. 9, 2005

Related U.S. Application Data

(60) Provisional application No. 60/526,294, filed on Dec. 3, 2003.

(51) Int. Cl.
*G06K 9/46* (2006.01)
(52) U.S. Cl. .................... 382/246; 382/248; 382/250; 382/232

(58) Field of Classification Search ................. 382/232, 382/250, 248, 246; 375/240.03, E7.093; 708/233
See application file for complete search history.

(56) References Cited

U.S. PATENT DOCUMENTS

| 5,594,679 A | 1/1997 | Iwata ......................... 708/521 |
| 6,091,856 A * | 7/2000 | Terane et al. ................. 382/246 |

FOREIGN PATENT DOCUMENTS

| CN | 1108865 A | 9/1995 |
| TW | 364269 | 7/1999 |
| TW | 040634 | 6/2002 |

OTHER PUBLICATIONS

Lee et al., "A Pipelined Dataflow Small Micro-Coded Asynchronous Processor and its Application to DCT", IEEE, vol. 4, May 2001, pp. IV-910 to IV-913.*

* cited by examiner

*Primary Examiner*—Anh Hong Do

(57) ABSTRACT

A method and system for applying pipeline architecture to discrete cosine transform and inverse discrete cosine transform. Each of the discrete cosine transform and inverse cosine transform are divided into four phases computed by process elements. Each phase can be designed by adjusting the amount of process elements according the demand of performance.

40 Claims, 9 Drawing Sheets

METHOD AND SYSTEM FOR DISCRETE COSINE TRANSFORMS/INVERSE DISCRETE COSINE TRANSFORMS BASED ON PIPELINE ARCHITECTURE

RELATED APPLICATIONS

The present application is based on, and claims priority from, Provisional Application No. 60/526,294, filed Dec. 3, 2003, the disclosure of which is hereby incorporated by reference herein in its entirety.

BACKGROUND OF THE INVENTION

1. Field of the Invention

The presented invention relates to a method and system for discrete cosine transforms/inverse discrete cosine transforms, which especially relates to a method and system for discrete cosine transforms/inverse discrete cosine transforms based on pipeline architecture.

2. Description of the Prior Art

Because the discrete cosine transform (DCT) is suitable for de-correlating real-valued signals and to concentrate signal components in low frequency, DCT has been widely used in image compression system and software. For example, DCT and IDCT (inverse discrete cosine transform) have been applied on H.261 standard for video conference, and applied on JPEG standard for still image, MPEG standard for moving pictures that established by ISO (International Standard Organization).

In foregoing application, DCT is used in data compression, and IDCT is used in data decompression. One of the most famous DCT/IDCT technology is the Fast Fourier Transform (FFT) based on Lee's algorithm. Referring to FIG. 1A, FIG. 1A shows the Lee's algorithm implementing in shuttle exchange circuit architecture, therein DCT procedure is divided into 4 computing phases as first computing phase, second computing phase, third computing phase, and fourth computing phase, in which eight parallel numerical data, X[0], X[1], ..., X[7] are inputted, and then perform discrete cosine transform to output eight parallel numerical data, Y[0], Y[1], ..., Y[7]. The DCT processor illustrating in FIG. 1A could be divided into two blocks: DCT processor 1 and DCT post-processor 2. DCT processor 1 is a composition of twelve similar process elements 3 and designed in butterfly circuits architecture, which followed a DCT post-processor 2 composed of five addition units 4 and one fixed-coefficient multiplication unit 5. Each process element 3 includes an addition unit 31, a subtract unit 32, and a fixed-coefficient multiplication unit 5. With respect to the fixed-coefficient multiplication unit in process element 3, in which there are four symbolized as A, two symbolized as B, two symbolized as C, and four symbolized as D, E, F, and G for each. The numerical value for those fixed-coefficient multiplication units which symbolized as A, B, C, D, E, F, and G are $$\tfrac{1}{2}\cos(\pi/4),\ \tfrac{1}{2}\cos(\pi/8),\ \tfrac{1}{2}\cos(3\pi/8),\ \tfrac{1}{2}\cos(\pi/16),$$
$$\tfrac{1}{2}\cos(3\pi/16),\ \tfrac{1}{2}\cos(7\pi/16),\ \text{and}\ \tfrac{1}{2}\cos(5\pi/16)$$

for each other. If regardless of individual addition unit, subtract unit, and multiplication unit, DCT procedure illustrating in FIG. 1A needs no control devices to handle whole computing procedure. The DCT data-flow dependence design unnecessary of control devices may design in data-flow architecture directly.

In proportion to FIG. 1A, FIG. 1B is a simplified chart of IDCT circuits implementing via Lee's algorithm. As the same as DCT, IDCT procedure is also divided into four computing phases as first computing phase, second computing phase, third computing phase, and fourth computing phase, in which eight parallel numerical data, Y[0], Y[1], ..., X[7] are inputted, and then perform inverse discrete cosine transform to output eight parallel numerical data, Y[0], Y[1], ..., Y[7]. Also the IDCT procedure in FIG. 1B is divided into two blocks: IDCT processor 7 and IDCT prior-processor 6. IDCT processor 7 is a compositions of twelve similar process elements 8 and designed in butterfly circuits architecture, which further connects to the IDCT prior-processor 6 composed of five addition units 9 and one fixed-coefficient multiplication unit 10. Each process element 8 includes an addition unit 81, a subtract unit 82, and a fixed-coefficient multiplication unit 10. With respect to the fixed-coefficient multiplication unit in process element 8, in which there are four symbolized as A, two symbolized as B, two symbolized as C, and four symbolized as D, E, F, and G for each. The numerical value for those fixed-coefficient multiplication units symbolized as A, B, C, D, E, F, and G are the same to those appeared in FIG. 1A.

Because the DCT/IDCT processor implemented in above-mentioned Lee's algorithm architecture may be constructed with similar processing elements, it has advantage of modular design and re-usage. Nowadays DCT/IDCT could apply on many aspects of application, such as JPEG, MPEG, or HDTV, for which different applications need different computation efficiency, and if the needed process elements could be adjusted for different demands of performance, more benefits may be achieved in the aspects of space and cost.

SUMMARY OF THE INVENTION

Based on foregoing motive, the invention provides a method for discrete cosine transform and inverse discrete cosine transform. By one or multiple sets of process modules, DCT/IDCT procedure could be accomplished with four computing phases, and be able to adjust the amounts of process elements according to the demand of performance.

The invention also provides a system for discrete cosine transform and inverse discrete cosine transform, which is capable of accomplishing each computing phase of DCT/IDCT by utilizing one common process module, two process modules, and four process modules for each of three architectures. And, the circuits (process module) for each computing phase could be designed with one or multiple process elements and computed in the way of parallel computing according to the demand of performance.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

Some appropriate and preferred embodiments of the present invention will now be described in the following. It should be noted, however, that the embodiment is merely an example and can be variously modified without departing from the range of the present invention.

It is to be understood, however, that the drawings, which are not to scale, are designed for the purpose of illustration and not as a definition of the limits of the invention, for which reference should be made to the appended claims.

Figure 1A:
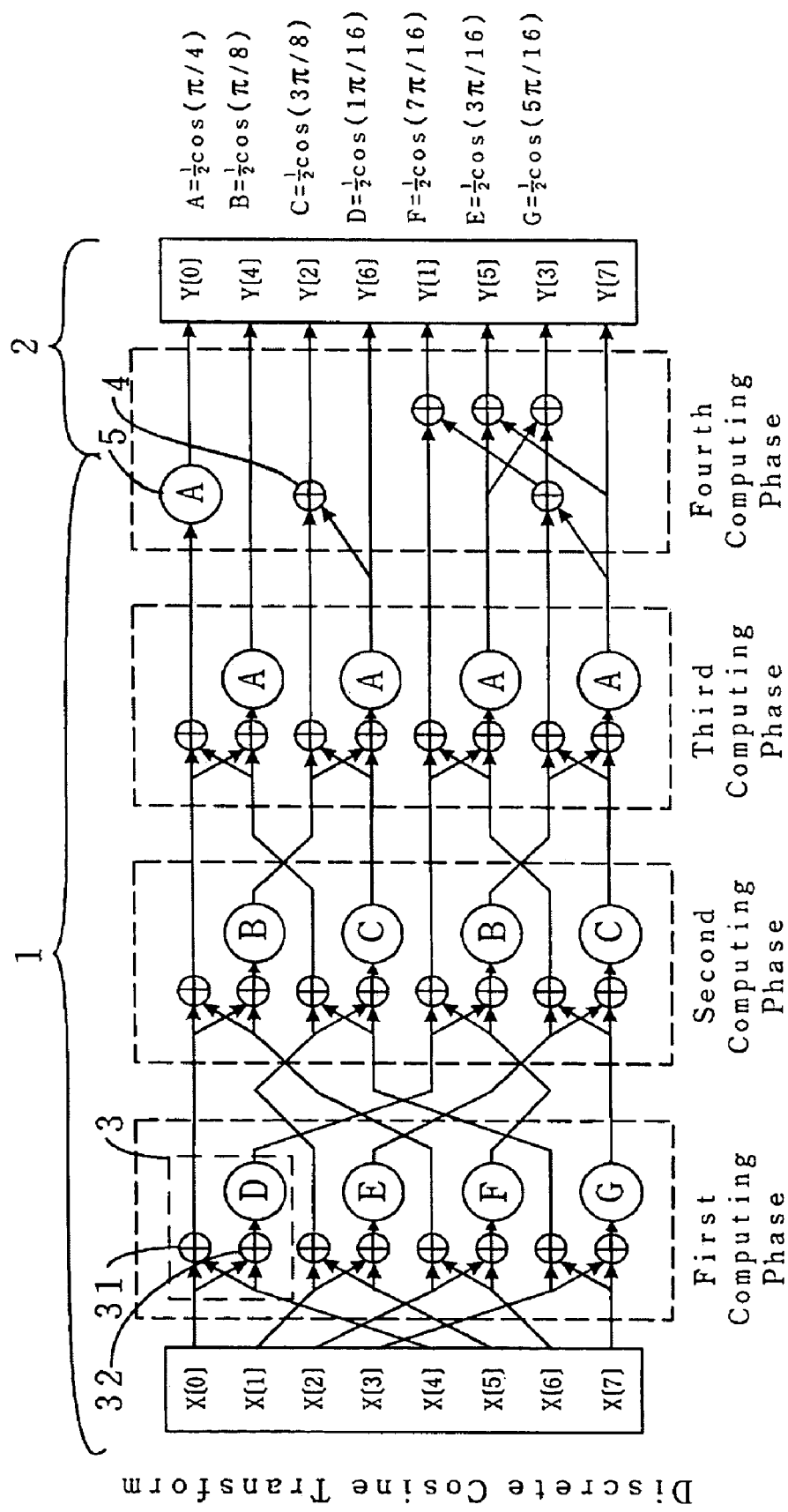
FIG. 1A and FIG. 1B show the block diagrams for DCT/IDCT of prior art respectively.
Figure 1B:
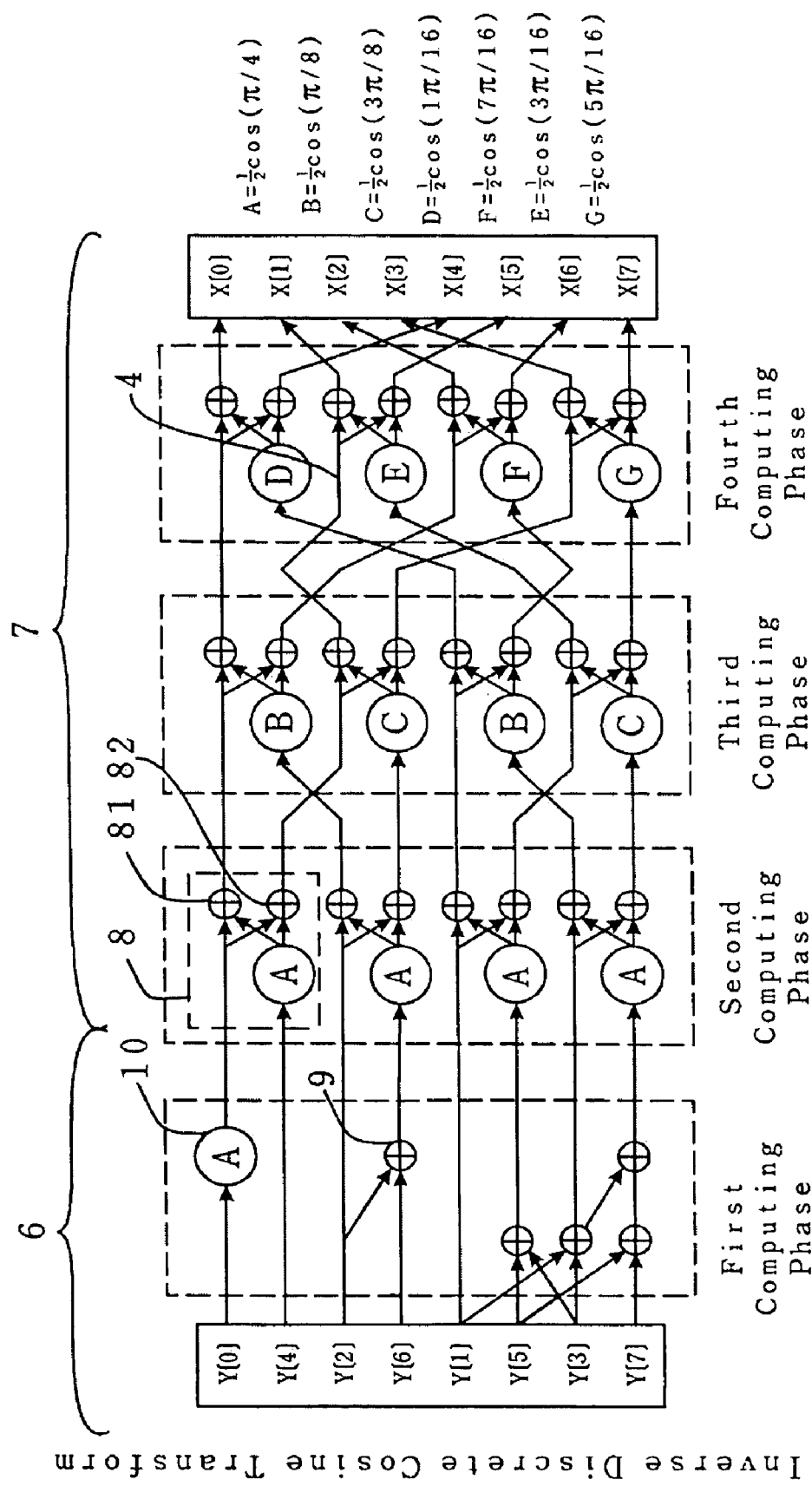
Figure 2A:
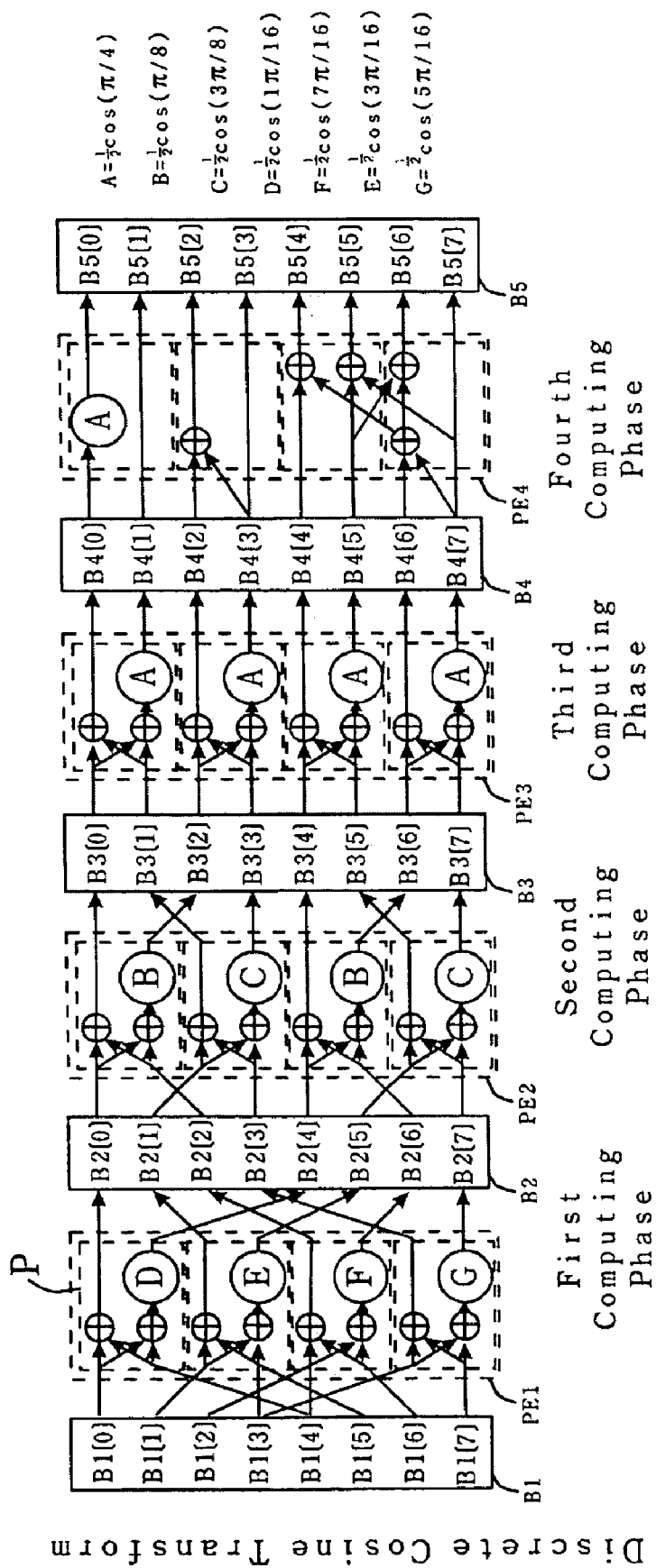
FIG. 2A and FIG. 2B show the block diagrams of the first embodiment of the invention.
Figure 2B:
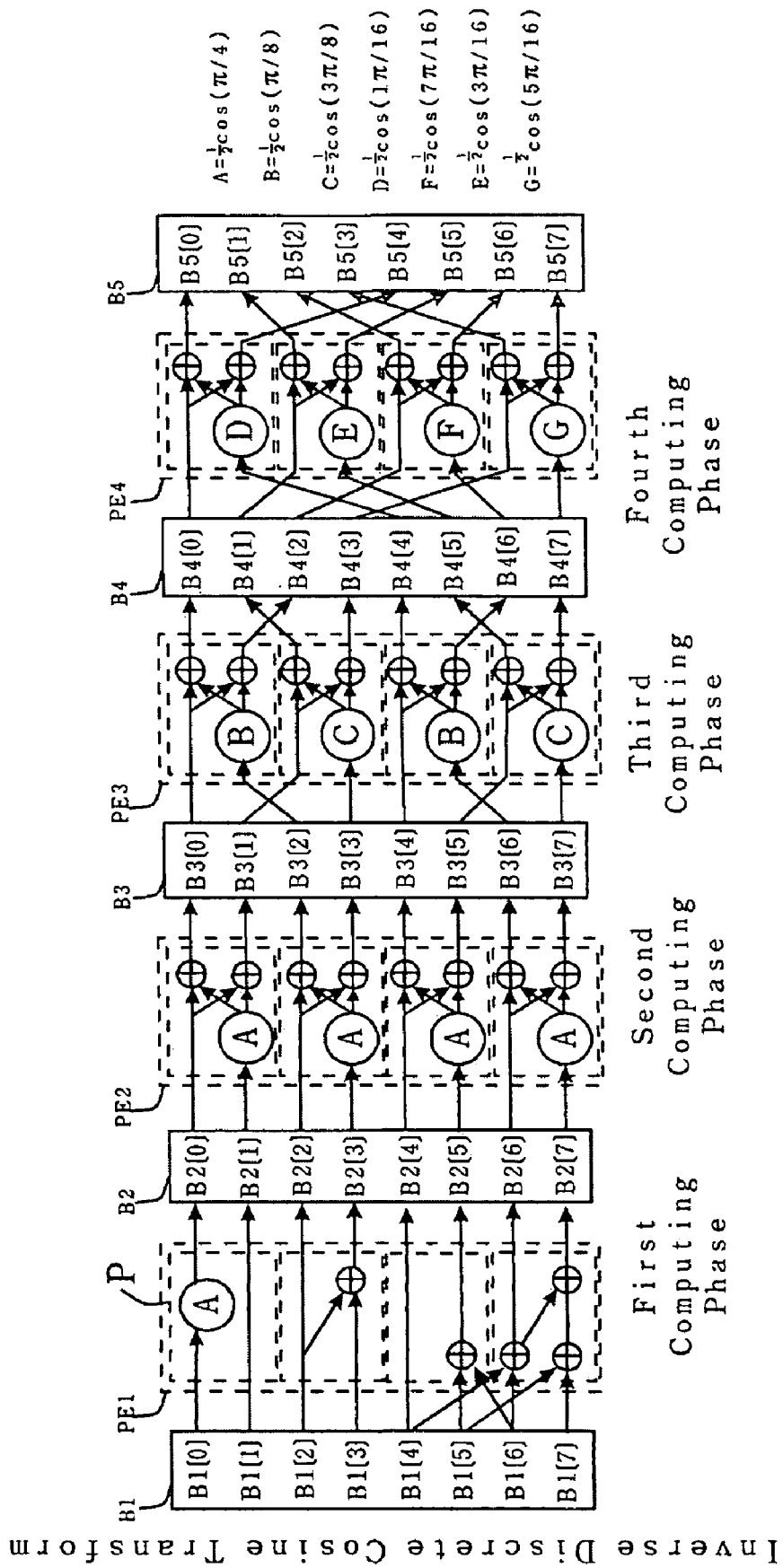

With regard to Lee's algorithm in prior art, each output value of DCT/IDCT process element needs at most three addition computations. Hence, if exists a process element which is capable of accomplishing three addition computations, the DCT or IDCT processor could be constructed simply by this process element. Based on foregoing motive, FIG. 2A and FIG. 2B illustrate the diagrams of first embodiment of the invention, in which discloses a system applying pipeline architecture for discrete cosine transform and inverse discrete cosine transform. Referring to FIG. 2A and FIG. 2B, five buffers (first buffer B1, second buffer B2, third buffer B3, fourth buffer B4, and fifth buffer B5) and four process modules (first process module PE1, second process module PE2, third process module PE3, and fourth process module PE4) are used to perform Lee's algorithm in four computing phases. Each computing result for corresponding computing phase is generated by corresponding process module, it means, after first computing phase, second computing phase, third computing phase, and fourth computing phase are performed in first process module PE1, second process module PE2, third process module PE3, and fourth process module PE4 respectively, the computing results will then output to second buffer B2, third buffer B3, fourth buffer B4, and fifth buffer B5 for each. In other words, when the first input data has been computed in first computing phase, then the second input data inputs into system. Next, perform second computing phase to first input data in PE2, and perform first computing phase to second input data in PE1 respectively and simultaneously, and then a third input data inputs into system after the computations finished. Therefore, every input data is inputted into system in turn and is performed in each computing phase in corresponding process modules, and finally output the DCT/IDCT results until the input data finishes all four computing phases.

Each process module includes one or more process element P, therein each process element P receives the input data and then outputs two numerical values to next buffer after computation. If the parallel inputted data could divide into 2n sets, each computing phase could be accomplished by n times different computations with one process element P, or accomplished by one or several times computations with multiple process elements P. For example, if each input data has eight numerical values, each computing phase can been done with four times computations with one process element P, by 2 times computations with two process elements P, or one time computation with four process elements P. Amounts of process element P for each computing phase are not limited in the invention. Furthermore, process element P may compute with partial bits of input data, in other words, the two outputted numerical values of each process element P could be generated after one or more times computation. For instance, process element P may perform computation with one bit of input data which have eight bits, hence process element P must do eight times computation to output two numerical values to buffer. Besides, it's allowable to utilize multiple process elements P to perform parallel computation with one or more bits, the amounts of bits in one computation are not limited in the invention.

In accordance to previous descriptions, each process module includes one or more process elements P for accomplishing every computing phases of DCT/IDCT. Referring to FIG. 2A, the process element P in process module PE1, PE2, and PE3 are the same, but those in PE4 are a little complicated. Summarily speaking, these process elements P possess the computing abilities listed beneath: adding a first input value and a second input value to output a first output value, and subtracting second input value from first input value and then multiplying by a coefficient to output a second output value; bypassing first input value and second input value directly to output a first output value and a second output value respectively; multiplying first input value by a coefficient to output a first output value, and bypassing second input value to output a second output value; bypassing first input value to output a first output value, and adding first input value and second input value to output a second output value; adding first input value and a third input value to output a first output value, and adding second input value and a fourth input value to output a second output value; and adding first input value, second input value, and third input value together to output a first output value, and bypassing second input value directly to output a second output value. According to above descriptions, the process element P needs at most three addition units, one subtract unit, and one multiplication unit to accomplish foregoing computations.

Similarly, the process element P of process module PE2, PE3, PE4 of IDCT illustrating in FIG. 2A are the same, and those in PE1 are a little complicated as those of PE1 of DCT. If we summarize all computations that all process elements P have to accomplish, it concludes that process elements P of IDCT have following computing abilities: adding a first input value with a product of a second input value and a coefficient and a first input value to output a first output value, and subtracting the second input value multiplied by a coefficient from the first input value to output a second output value; bypassing first input value and second input value directly to output a first output value and a second output value respectively; multiplying first input value by a coefficient to output a first output value, and bypassing second input value to output a second output value directly; bypassing first input value to output a first output value directly, and adding second input value and a third input value to output a second output value; and adding first input value and third input value to output a first output value, and adding first input value, second input value, third input value, and a fourth input value together to output a second output value. Because the coefficient for fixed coefficient multiplication unit may be −1, hence the computation of adding a first input value and a second input value may instead by multiplying second input value by −1 and then subtracting it from first input value, which saves one addition unit in IDCT. According to above descriptions, the process element P needs at most two addition units, one subtract unit, and one multiplication unit to accomplish foregoing computations.

To summarize all needed computing abilities for process elements in DCT and IDCT, we found that if we can apply a first process element which is capable of accomplishing all computations mentioned above to form each process modules, wherein each first process element chooses one from all computations to operate during every computing time, then all process modules could be simply formed of the first process element and achieve the advantage of modular design.

Besides, the process elements P for second, third, and fourth computing phase of IDCT, or the process elements P for first, second, and third computing phase of DCT may utilize a kind of simplified process element, called second process element, to reduce the cost. The second process element needs merely the computing abilities as follows: adding a first input value and a second input value to output a first output value, and subtracting second input value from first input value and then multiplying by a coefficient to output a second output value (this is a major computation in DCT); and adding a second input value multiplied by a coefficient to a first input value to output a first output value, and subtracting the second input value multiplied by a coefficient from the first input value to output a second output value (this is major computation in IDCT). Hence, we can take use of one or more first process elements to form the first process module PE1 of IDCT for responsible for first computing phase, but utilize one or more second process elements to form the other process modules PE2, PE3, and PE4; or utilize one or more first process elements to form the fourth process module PE4 of DCT for responsible for fourth computing phase, but utilize one or more second process elements to form the other process modules PE1, PE2, and PE3. The amounts of process elements may be determined in accordance to the demand of performance, for example, only one process element (first or second process element) to perform one computing phase is allowable. Comparing to prior art, this embodiment can adjust the amounts of process elements which achieves the advantage of flexible design.

Figure 3:
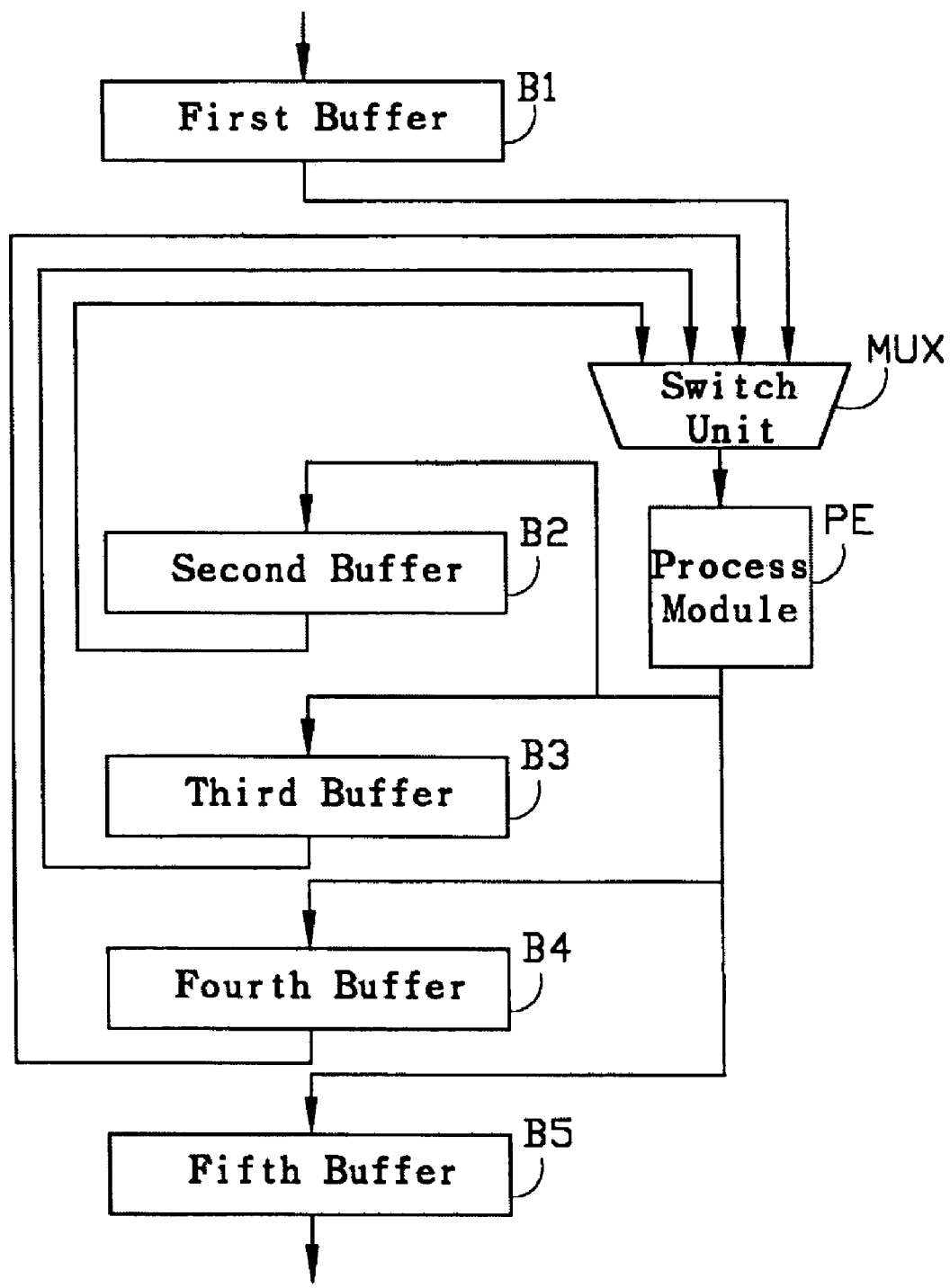
FIG. 3 shows the block diagram for the second embodiment of the invention.

The second embodiment of the invention is a system for applying a common process module to DCT or IDCT, as in FIG. 3, in which includes a common process module, a first buffer B1, a second buffer B2, a third buffer B3, a fourth buffer B4, a fifth buffer B5, and a switch unit MUX, wherein process module PE comprises one or multiple process elements, which could be implemented by the first process element as described in first embodiment of the invention. In this embodiment of the invention, Lee's algorithm is performed and divided in four phases. Each computing result of different phase is generated by the common process module PE, for further speaking, switch unit MUX switches buffers B1, B2, B3, and B4 to the common process PE in turn to perform four computing phases, and then output computing results to buffer B2, B3, B4, and B5 respectively. Hence only after four computing phases have been finished, a set of numerical values outputs and another set of input data inputs afterward. In other words, every set of input data needs four phases' computing time to accomplish one DCT/IDCT procedure. As far as the detail computations and the process elements are the same to those described in first embodiment of the invention, which won't describe repeatedly here.

Figure 4:
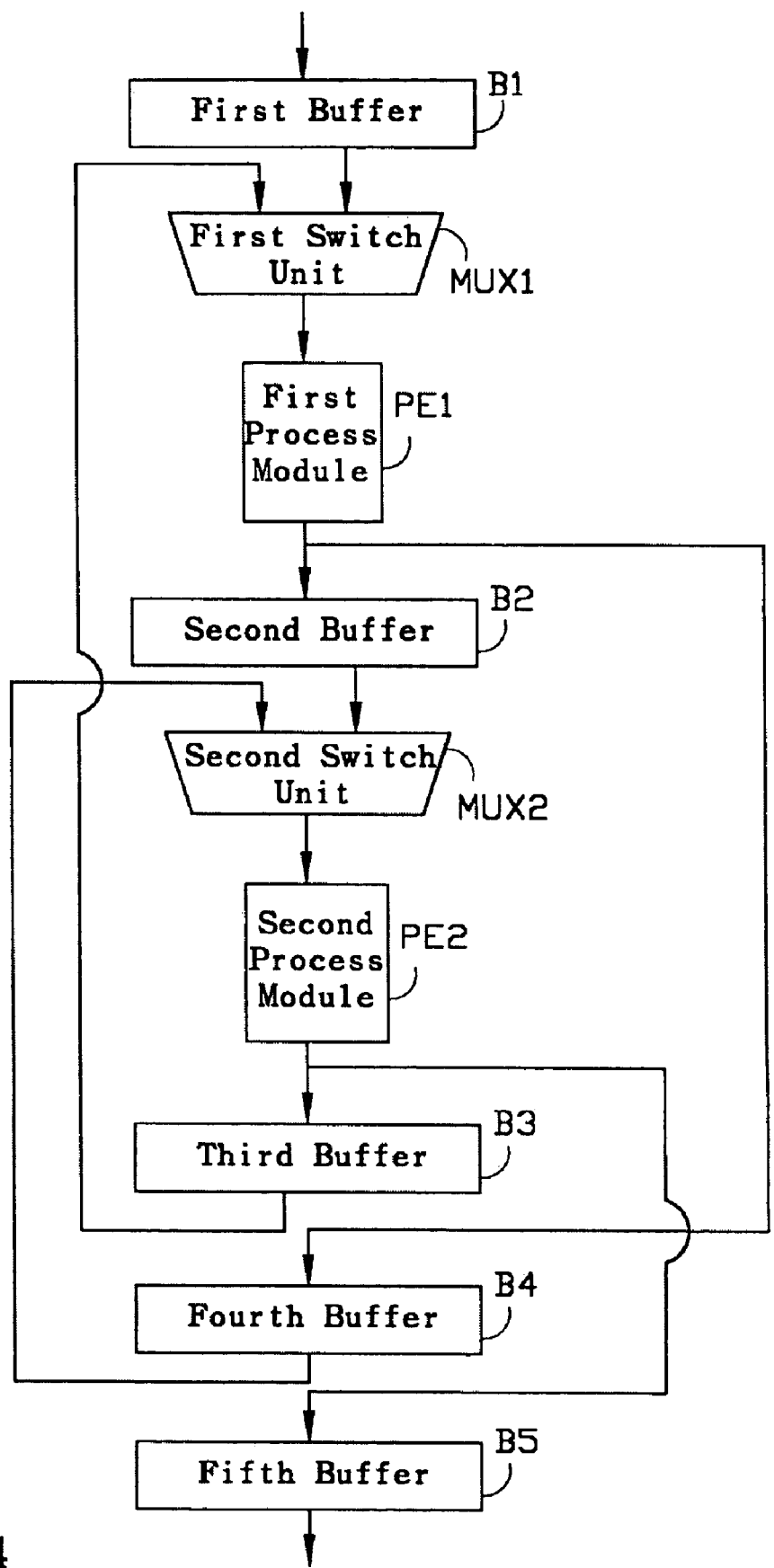
FIG. 4 shows the block diagram for the third embodiment of the invention.

The third embodiment of the invention is a system for applying multiple common process modules to DCT or IDCT. As shown in FIG. 4, in which includes a first process module PE1, a second process module PE2, a first buffer B1, a second buffer B2, a third buffer B3, a fourth buffer B4, a fifth buffer B5, a first switch unit MUX1, and a second switch unit MUX2. Each process module includes one or multiple process elements, which may completely be implemented by foregoing first process element described in first embodiment of the invention, or in the way that the process elements of first process module PE1 adopt first process element, but second process module PE2 adopts foregoing second process element. Also Lee's algorithm is divided into four computing phases in this embodiment, in which each computing result of different computing phase is generated by process elements of corresponding process modules. In the way of parallel processing, first switch unit MUX1 switches first buffer B1 and third buffer B3 in turn to first process module PE1 for performing first computing phase and third computing phase, then output computing results to second buffer B2 and fourth buffer B4 respectively. In the same moment, also second switch unit MUX2 switches second buffer B2 and fourth buffer B4 in turn to second process module PE2 for performing second computing phase and fourth computing phase, then output computing results to third buffer B3 and fifth buffer B5 respectively. Among four computing phases, first computing phase and third computing phase is done simultaneously, and second computing phase and fourth computing phase is done simultaneously, too. Therefore, a complete DCT/IDCT procedure must pass through four phases' computations, therein twice are done in process module PE1 and twice are done in process module PE2, to output a set of numerical values and then input a set of input data respectively. Similarly, foregoing first process element, second process element, and all related computations are the same to those described in first embodiment.

Figure 5:
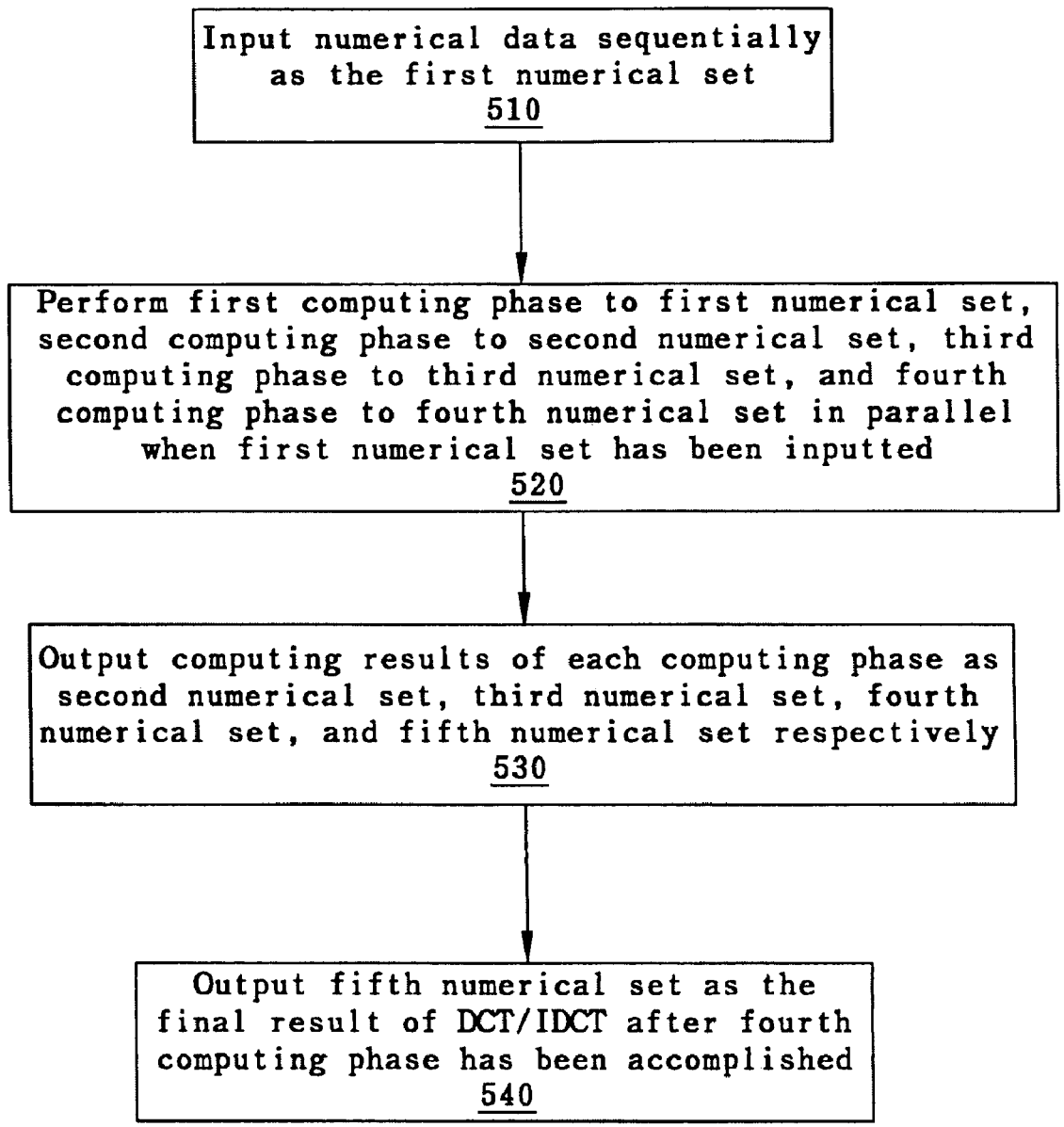
FIG. 5 shows the block diagram for the fourth embodiment of the invention.

The fourth embodiment of the invention is a method for applying pipeline architecture to DCT or IDCT, and FIG. 5 shows the flow chart of this embodiment. As illustrated in step 510, in first, input numerical data sequentially as the first numerical set. Next, instep 520, after first numerical set has been inputted, then perform first computing phase to first numerical set, second computing phase to second numerical set, third computing phase to third numerical set, and fourth computing phase to fourth numerical set in parallel. In step 530, after each computing phase has been accomplished, then output each computing result of four computing phases as second numerical set, third numerical set, fourth numerical set, and fifth numerical set respectively. At last step 540, output fifth numerical set as the final result of DCT or IDCT after fourth computing phase has been accomplished. Therein, each numerical set includes multiple numerical values, and all computing phases are accomplished by foregoing process elements as described in first embodiment of the invention. Summarily speaking, when a plurality of input data has been inputted as the first numerical set, the first numerical set will transform into second, third, fourth, and fifth numerical set sequentially after each computing phase, and in which fifth numerical set is the final result of DCT/IDCT procedure for said plurality of input data.

Figure 6:
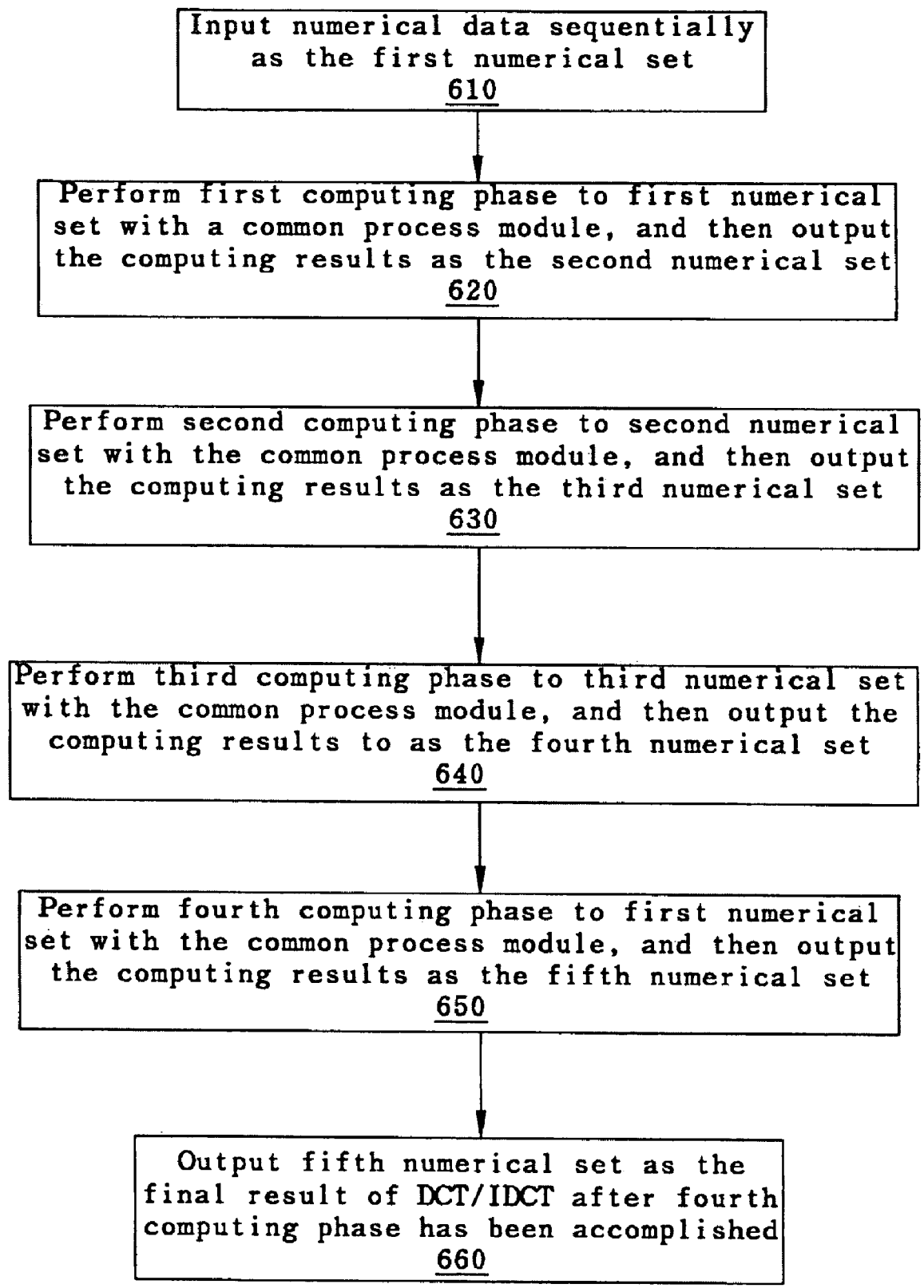
FIG. 6 shows the block diagram for the fifth embodiment of the invention.

The fifth embodiment of the invention is a method for applying a common process module to DCT or IDCT. Referring to step 610 shown in FIG. 6, firstly input numerical data sequentially as the first numerical set. Then in step 620, when first numerical set has been inputted, perform first computing phase to first numerical set with a common process module, and then output the computing results as the second numerical set. Next, in step 630, perform second computing phase to second numerical set with the common process module, and then output the computing results as the third numerical set. In step 640, perform third computing phase to third numerical set with the common process module, and then output the computing results as the fourth numerical set. After third computing phase has been finished, as shown in step 650, perform fourth computing phase to fourth numerical set with the common process module, and then output the computing results as the fifth numerical set. Finally, in step 660, output fifth numerical set as the final result of DCT/IDCT procedure. The mentioned common process module is the same to which described in second embodiment of the invention, which will not explain redundantly here.

Figure 7:
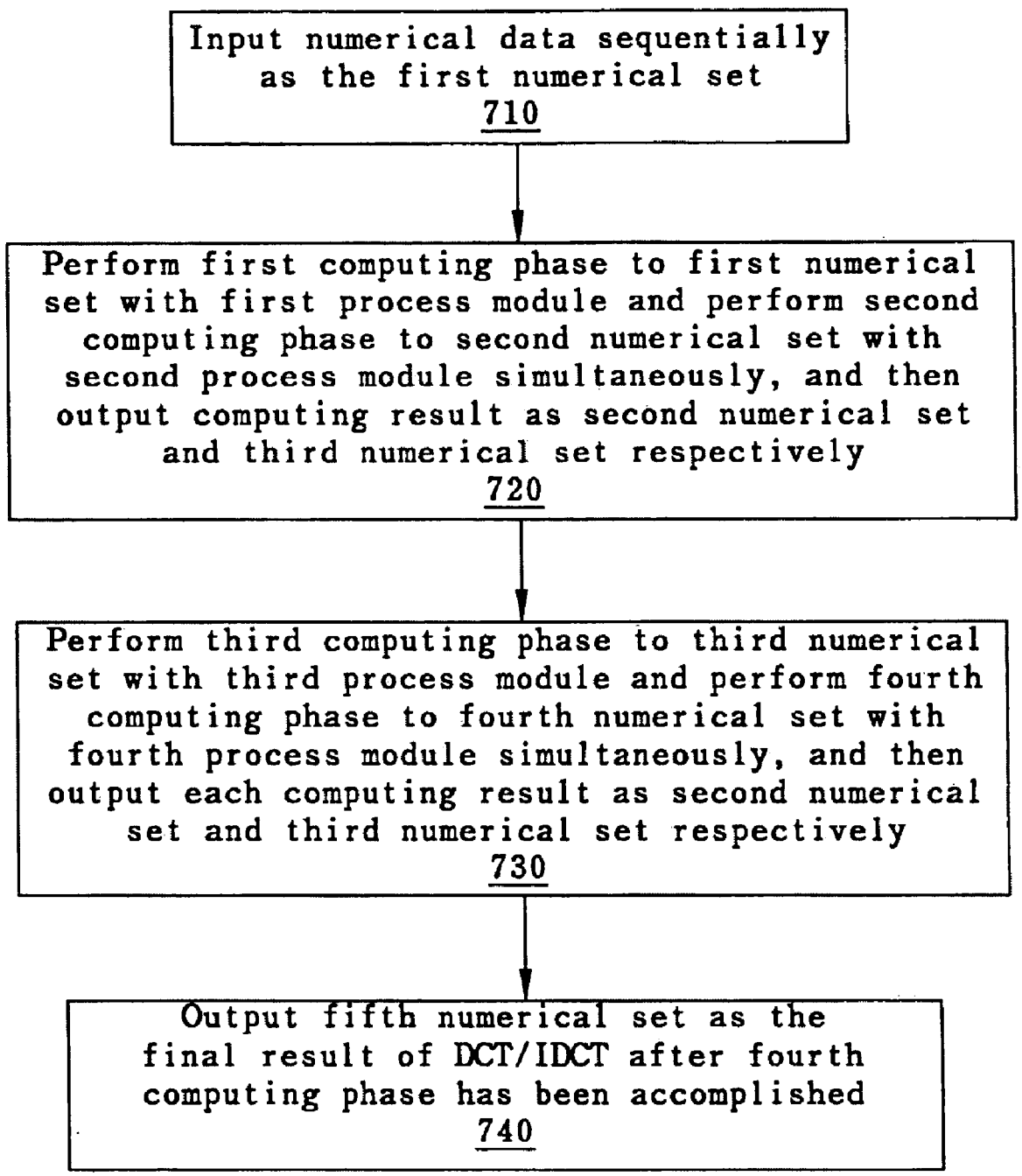
FIG. 7 shows the block diagram for the sixth embodiment of the invention.

The sixth embodiment of the invention is a method for applying multiple process modules to DCT or IDCT. Referring to step 710 in FIG. 7, first input numerical data sequentially as the first numerical set. Then in step 720, after first numerical set has been inputted, perform first computing phase to first numerical set with first process module and perform second computing phase to second numerical set with second process module simultaneously, and then output each computing result as second numerical set and third numerical set respectively. Next in step 730, after first and second computing phase have been finished, apply first process module for third computing phase on third numerical set and apply second process module for fourth computing phase on fourth numerical set simultaneously, and then output each computing result as fourth numerical set and fifth numerical set respectively. Finally, in step 740, output fifth numerical set as the final result of DCT/IDCT procedure. Details of mentioned process modules and computations are as the same as those described in fourth embodiment of the invention.

The above-mentions are only the preferred embodiments of the present invention, not intended to limit the scope thereof. It will be appreciated and carried out by those professions skilled in the art. Thus, many modifications of the embodiments that can be made without departing from the spirit of the present invention should be covered by the following claims.

What is claimed is:

1. A method for applying pipeline architecture with a common process module to discrete cosine related transform, comprising:

inputting a sequence of numerical data in turn to a first buffer as a first numerical set;

performing a first computing phase of said discrete cosine related transform to said first numerical set with said common process module after said first numerical set has been inputted from said first buffer, and then outputting computing result to a second buffer as a second numerical set;

performing a second computing phase of said discrete cosine related transform to said second numerical set with said common process module after said second numerical set has been inputted from said second buffer, and then outputting computing result to a third buffer as a third numerical set;

performing a third computing phase of said discrete cosine related transform to said third numerical set with said common process module after said third numerical set has been inputted from said third buffer, and then outputting computing result to a fourth buffer as a fourth numerical set;

performing a fourth computing phase of said discrete cosine related transform to said fourth numerical set with said common process module after said fourth numerical set has been inputted from said fourth buffer, and then outputting computing result to a fifth buffer as a fifth numerical set; and outputting said fifth numerical set after said fourth computing phase has been finished;

wherein said common process module is formed of at least a process element having a plurality of computing abilities listed beneath:

adding a first input value and a second input value to output a first output value, and subtracting said second input value from said first input value and then multiplying by a coefficient to output a second output value;

bypassing said first input value and said second input value directly to output said first output value and said second output value respectively;

multiplying said first input value by said coefficient to output said first output value, and bypassing said second input value to output said second output value;

bypassing said first input value to output said first output value, and adding said first input value and said second input value to output said second output value;

adding said first input value, a third input value and a fourth input value together to output said first output value, and adding said second input value and a fourth input value to output said second output value;

adding said first input value, said second input value, and said third input value together to output said first output value, and bypassing said second input value directly to output said second output value;

adding said first input value and the product of said second input value and said coefficient to output said first output value, and subtracting the product of said second input value and said coefficient from said first input value to output said second output value;

bypassing said first input value to output said first output value directly, and adding said second input value and said third input value to output said second output value; and adding said first input value and said third input value to output said first output value, and adding said first input value, said second input value, said third input value, and said fourth input value together to output said second output value.

2. The method of claim 1, wherein said discrete cosine related transform is discrete cosine transform (DCT) for each one of said first computing phase, said second computing phase, said third computing phase, and said fourth computing phase.

3. The method of claim 1, wherein said discrete cosine related transform is inverse discrete cosine transform (IDCT) for each one of said first computing phase, said second computing phase, said third computing phase, and said fourth computing phase.

4. The method of claim 1, further comprising the following details:

said process element performing one said computing ability during each computation;

said first input value, said second input value, said third input value, and said fourth input value being included among said fourth numerical set in said fourth computing phase;

said first input value and said second input phase being included among said first numerical set, said second numerical set, said third numerical set, and said fourth numerical set in said first computing phase; and said second computing phase, and said third computing, and said first output value and said second output value are included among said second numerical set, said third numerical set, said fourth numerical set, and said fifth numerical set in said first computing phase, said second computing phase, said third computing phase, and said fourth computing phase respectively.

5. A system for applying pipeline architecture with a common process module to discrete cosine related transform, comprising:
- a common process module for performing a discrete cosine related transform, wherein said discrete cosine related transform comprises a first computing phase, a second computing phase, a third computing phase, and a fourth computing phase;
- a first buffer for receiving a sequence of input data and providing numerical values to said common process module as inputs in said first computing phase;
- a second buffer for providing data storage for outputs of said common process module after said first computing phase, and for providing numerical values to said common process module as inputs in said second computing phase;
- a third buffer for providing data storage for outputs of said common process module after said second computing phase, and providing numerical values to said common process module as inputs in said third computing phase;
- a fourth buffer for providing data storage for outputs of said common process module after said third computing phase, and providing numerical values to said common process module as inputs in said fourth computing phase;
- a fifth buffer for providing data storage for outputs of said common process module after said fourth computing phase, and outputting a set of numerical values; and
- a switch unit for switching said first buffer, said second buffer, said third buffer, and said fourth buffer to said common process module in turn in said first computing phase, said second computing phase, said third computing phase, and said fourth computing phase respectively.

6. The system of claim 5, wherein said discrete cosine related transform is discrete cosine transform or inverse discrete cosine transform.

7. The system of claim 5, wherein said common process module is formed of at least a process element having a plurality of computing abilities listed beneath:
- adding a first input value and a second input value to output a first output value, and subtracting said second input value from said first input value and then multiplying by a coefficient to output a second output value;
- bypassing said first input value and said second input value directly to output said first output value and said second output value respectively;
- multiplying said first input value by said coefficient to output said first output value, and bypassing said second input value to output said second output value;
- bypassing said first input value to output said first output value, and adding said first input value and said second input value to output said second output value;
- adding said first input value, a third input value and a fourth input value to output said first output value, and adding said second input value to a fourth input value to output said second output value;
- adding said first input value, said second input value, and said third input value together to output said first output value, and bypassing said second input value directly to output said second output value;
- adding said first input value and a product of said second input value and said coefficient to output said first output value, and subtracting a product of said second input value and said coefficient from said first input value to output said second output value;
- bypassing said first input value to output said first output value directly, and adding said second input value and said third input value to output said second output value; and
- adding said first input value and said third input value to output said first output value, and adding said first input value, said second input value, said third input value, and said fourth input value together to output said second output value.

8. The system of claim 7, wherein said process element performs one said computing ability during each computation, and:
- inputting said first input value, said second input value, said third input value, and said fourth input value from said fourth numerical set in said fourth computing phase;
- inputting said first input value and said second input value from said first buffer in said first computing phase, from said second buffer in said second computing phase, and from said third buffer in said third computing phase respectively; and
- including said first output value and said second output value among said second numerical set, said third numerical set, said fourth numerical set, and said fifth numerical set after said first computing phase, said second computing phase, said third computing phase, and said fourth computing phase respectively.

9. A method for applying pipeline architecture with multiple process modules to discrete cosine related transform, comprising:
- inputting a sequence of numerical data in turn to a first buffer as a first numerical set;
- performing a first computing phase of said discrete cosine related transform to said first numerical set with a first process module and performing a second computing phase of said discrete cosine related transform to a second numerical set with a second process module simultaneously after said first numerical set has been inputted from said first buffer, and then outputting each computing result as said second numerical set and a third numerical set respectively, wherein said second numerical set has been inputted into a second buffer, and said third numerical set has been inputted into a third buffer;
- performing a third computing phase of said discrete cosine related transform to said third numerical set inputted from said third buffer with said first process module and performing a fourth computing phase of said discrete cosine related transform to a fourth numerical set with said second process module simultaneously after said first computing phase and said second computing phase have been accomplished, and then outputting each computing result as said fourth numerical set and a fifth numerical set respectively, wherein said fourth numerical set has been inputted into a fourth buffer, and said fifth numerical set has been inputted into a fifth buffer; and
- outputting said fifth numerical set after said fourth computing phase has been finished.

10. The method of claim 9, wherein said discrete cosine related transform is discrete cosine transform for each one of said first computing phase, said second computing phase, said third computing phase, and said fourth computing phase.

11. The method of claim 9, wherein said discrete cosine related transform is inverse discrete cosine transform for each one of said first computing phase, said second computing phase, said third computing phase, and said fourth computing phase.

12. The method of claim 9, wherein said first process module is formed of at least a first process element having a plurality of computing abilities listed beneath:

adding a first input values and a second input value to output a first output value, and subtracting said second input value from said first input value and then multiplying by a coefficient to output a second output value;

bypassing said first input value and said second input value directly to output said first output value and said second output value respectively;

multiplying said first input value by said coefficient to output said first output value, and bypassing said second input value to output said second output value;

bypassing said first input value to output said first output value, and adding said first input value and said second input value to output said second output value;

adding said first input value, a third input value and a fourth input value to output said first output value, and adding said second input value and a fourth input value to output said second output value;

adding said first input value, said second input value, and said third input value together to output said first output value, and bypassing said second input value directly to output said second output value;

adding said first input value and a product of said second input value and said coefficient to output said first output value, and subtracting a product of said second input value and said coefficient from said first input value to output said second output value;

bypassing said first input value to output said first output value directly, and adding said second input value and said third input value to output said second output value; and adding said first input value and said third input value to output said first output value, and adding said first input value, said second input value, said third input value, and said fourth input value together to output said second output value.

13. The method of claim 12, wherein said first process element performs one said computing ability during each computation, and said first input value, said second input value, said third input value, and said fourth input value are included among said fourth numerical set in said fourth computing phase, and said first output value and said second output value are included among said fifth numerical set in said fourth computing phase.

14. The method of claim 9, wherein said second process module is formed of said first process element and has the same amounts of said first process element to said first process module.

15. The method of claim 9, wherein said second process module is formed of at least a second process element having the computing abilities listed beneath:

adding a first input value and a second input value to output a first output value, and subtracting said second input value from said first input value and then multiplying by a coefficient to output a second output value; and adding said first value and a product of said second input value and said coefficient to output said first output value, and subtracting said second input value multiplied by said coefficient from said first input value to output said second output value.

16. The method of claim 15, wherein:

said first input value and said second input value are included among said first numerical set in said first computing phase, among said second numerical set in said second computing phase, and among said third numerical set in said third computing phase respectively; and said first output value and said second output value are included among said second numerical set in said second computing phase, among said third numerical set in said third computing phase, and among said fourth numerical set in said fourth computing phase respectively.

17. A system for applying pipeline architecture with multiple process modules to discrete cosine related transform, comprising:

a first process module for performing partial computations of a discrete cosine related transform, wherein said discrete cosine related transform comprises a first computing phase, a second computing phase, a third computing phase, and a fourth computing phase, in which said first computing phase and said third computing phase are accomplished with said first process module;

a second process module for performing said second computing phase and said fourth computing of said discrete cosine related transform, wherein said second computing phase and said fourth computing phase are performed simultaneously with said first computing phase and said third computing phase respectively;

a first buffer for receiving a sequence of input data and providing numerical values to said first process module as inputs in said first computing phase;

a second buffer for providing data storage for outputs of said first process module after said first computing phase, and providing numerical values to said second process module as inputs in said second computing phase;

a third buffer for providing data storage for outputs of said second process module after said second computing phase, and providing numerical values to said first process module as inputs in said third computing phase;

a fourth buffer for providing data storage for outputs of said first process module after said third computing phase, and providing numerical values to said second process module as inputs in said fourth computing phase;

a fifth buffer for providing data storage for outputs of said second process module after said fourth computing phase, and outputting a set of numerical values;

a first switch unit for switching said first buffer and said third buffer to said first process module in turn in said first computing phase and in said third computing phase respectively; and a second switch unit for switching said second buffer and said fourth buffer to said second process module in turn in said second computing phase and said fourth computing phase respectively.

18. The system of claim 17, wherein said discrete cosine related transform is discrete cosine transform.

19. The system of claim 17, wherein said discrete cosine related transform is inverse discrete cosine transform.

20. The system of claim 17, wherein said first process module is formed of at least a first process element having a plurality of computing abilities listed beneath:

adding a first input value and a second input value to output a first output value, and subtracting said second input value from said first input value and then multiplying by a coefficient to output a second output value;

bypassing said first input value and said second input value directly to output said first output value and said second output value respectively;

multiplying said first input value by said coefficient to output said first output value, and bypassing said second input value to output said second output value;

bypassing said first input value to output said first output value, and adding said first input value and said second input value to output said second output value;

adding said first input value, a third input value and a fourth input value to output said first output value, and adding said second input value to a fourth input value to output said second output value;

adding said first input value, said second input value, and said third input value together to output said first output value, and bypassing said second input value directly to output said second output value;

adding said first input value and a product of said second input value and by said coefficient to output said first output value, and subtracting a product of said second input value and said coefficient from said first input value to output said second output value;

bypassing said first input value to output said first output value directly, and adding said second input value to said third input value to output said second output value; and adding said first input value and said third input value to output said first output value, and adding said first input value, said second input value, said third input value, and said fourth input value together to output said second output value.

21. The system of claim 20, wherein said first process element performs one said computing ability during each computation, and said first input value, said second input value, said third input value, and said fourth input value are inputted from said fourth buffer in said fourth computing phase, and said first output value and said second output value are stored in said fifth numerical set in said fourth computing phase.

22. The system of claim 20, wherein said second process module is formed of said first process element and has the same amounts of said first process element to said first process module.

23. The system of claim 17, wherein said second process module is formed of at least a second process element having the computing abilities listed beneath:

adding a first input value to a second input value to output a first output value, and subtracting said second input value from said first input value and then multiplying by a coefficient to output a second output value; and adding said first input value and a product of said second input value and said coefficient to e to output said first output value, and subtracting a product of said second input value multiplied and said coefficient from said first input value to output said second output value.

24. The system of claim 23, wherein:

said first input value and said second input value are included among said first numerical set in said first computing phase, among said second numerical set in said second computing phase, and among said third numerical set in said third computing phase respectively; and said first output value and said second output value are included among said second numerical set in said second computing phase, among said third numerical set in said third computing phase, and among said fourth numerical set in said fourth computing phase respectively.

25. A method for applying pipeline architecture to discrete cosine related transform, comprising:

inputting a sequence of numerical data in turn as a first numerical set into a buffer;

performing a first computing phase, a second computing phase, a third computing phase, and a fourth computing phase of said discrete cosine related transform simultaneously to a first numerical set with a first process module, to a second numerical set with a second process module, to a third numerical set with a third process module, and to a fourth numerical set with a fourth process module respectively;

outputting computing result of said first computing phases, said second computing phase, said third computing phase and said fourth computing phase as said second numerical set, said third numerical set, said fourth numerical set, and said fifth numerical set respectively; and outputting said fifth numerical set after said fourth computing phase has been finished.

26. The method of claim 25, wherein said discrete cosine related transform is discrete cosine transform.

27. The method of claim 25, wherein said discrete cosine related transform is inverse discrete cosine transform.

28. The method of claim 25, wherein said fourth process module is formed of at least a first process element having a plurality of computing abilities listed beneath:

adding a first input value and a second input value to output a first output value, and subtracting said second input value from said first input value and then multiplying by a coefficient to output a second output value;

bypassing said first input value and said second input value directly to output said first output value and said second output value respectively;

multiplying said first input value by said coefficient to output said first output value, and bypassing said second input value to output said second output value;

bypassing said first input value to output said first output value, and adding said first input value to said second input value to output said second output value;

adding said first input value, a third input value and a fourth input value to output said first output value, and adding said second input value to a fourth input value to output said second output value;

adding said first input value, said second input value, and said third input value together to output said first output value, and bypassing said second input value directly to output said second output value;

adding said first input value and a product of said second input value and said coefficient to output said first output value, and subtracting said second input value multiplied by said coefficient from said first input value to output said second output value;

bypassing said first input value to output said first output value directly, and adding said second input value to said third input value to output said second output value; and adding said first input value and said third input value to output said first output value, and adding said first input value, said second input value, said third input value, and said fourth input value together to output said second output value.

29. The method of claim 28, wherein said first process element performs one said computing ability during each computation, and said first input value, said second input value, said third input value, and said fourth input value are included among said fourth numerical set in said fourth computing phase, and said first output value and said second output value are included among said fifth numerical set in said fourth computing phase.

30. The method of claim 28, said first process module, said second process module, and said third process module being formed of said first process element and each has the same amounts of said first process element to said fourth process module, wherein said first process element has the computing abilities listed beneath:

including said first input value and said second input value among said first numerical set, said second numerical set, a said third numerical set and a fourth numerical set in said first computing phase, said second computing phase and said fourth computing phase; and including said first output value and said second output value among said second numerical set, said third numerical set and said fourth numerical set in said first computing phase, said second computing phase and said third computing phase.

31. The method of claim 25, wherein said first process module, said second process module, said third is formed of at least a second process element having the computing abilities listed beneath:

adding a first input value and a second input value to output a first output value, and subtracting said second input value from said first input value and then multiplying by a coefficient to output a second output value; and adding said first input value and a product of said second input value and said coefficient to output said first output value, and subtracting a product of said second input value and said coefficient from said first input value to output said second output value.

32. The method of claim 31, wherein said first input value and said second input value are included among said first numerical set in said first computing phase, among said second numerical set in said second computing phase, and among said third numerical set in said third computing phase respectively, and said first output value and said second output value are included among said second numerical set in said first computing phase, among said third numerical set in said second computing phase, and among said fourth numerical set in said third computing phase respectively.

33. A system for applying pipeline architecture to discrete cosine related transform, comprising:

a first process module for performing partial computations of a discrete cosine related transform, wherein said discrete cosine related transform comprises a first computing phase, a second computing phase, a third computing phase, and a fourth computing phase, and in which said first computing phase is performed with said first process module;

a second process module for performing said second computing phase of said discrete cosine related transform;

a third process module for performing said third computing phase of said discrete cosine related transform;

a fourth process module for performing said fourth computing phase of said discrete cosine related transform, wherein said first computing phase, said second computing phase, said third computing phase, and fourth computing phase are performed simultaneously;

a first buffer for receiving a sequence of input data and providing numerical values to said first process module as inputs in said first computing phase;

a second buffer for providing data storage for outputs of said first process module after said first computing phase, and providing numerical values to said second process module as inputs in said second computing phase;

a third buffer for providing data storage for outputs of said second process module after said second computing phase, and providing numerical values to said first process module as inputs in said third computing phase;

a fourth buffer for providing data storage for outputs of said first process module after said third computing phase, and providing numerical values to said second process module as inputs in said fourth computing phase; and a fifth buffer for providing data storage for outputs of said second process module after said fourth computing phase, and outputting a set of numerical values.

34. The system of claim 33, wherein said discrete cosine related transform is discrete cosine transform.

35. The system of claim 33, wherein said discrete cosine related transform is inverse discrete cosine transform.

36. The system of claim 33, wherein said fourth process module is formed of at least a first process element having a plurality of computing abilities listed beneath:

adding a first input value and a second input value to output a first output value, and subtracting said second input value from said first input value and then multiplying by a coefficient to output a second output value;

bypassing said first input value and said second input value directly to output said first output value and said second output value respectively;

multiplying said first input value by said coefficient to output said first output value, and bypassing said second input value to output said second output value;

bypassing said first input value to output said first output value, and adding said first input value to said second input value to output said second output value;

adding said first input value, a third input value and a fourth input value to output said first output value, and adding said second input value and a fourth input value to output said second output value;

adding said first input value, said second input value, and said third input value together to output said first output value, and bypassing said second input value directly to output said second output value;

adding said first input value and a product of said second input value and said coefficient to output said first output value, and subtracting said second input value multiplied by said coefficient from said first input value to output said second output value;

bypassing said first input value to output said first output value directly, and adding said second input value and said third input value to output said second output value; and adding said first input value and said third input value to output said first output value, and adding said first input value, said second input value, said third input value, and said fourth input value together to output said second output value.

37. The system of claim 36, wherein said first process element performs one said computing ability during each computation, and said first input value, said second input value, said third input value, and said fourth input value are included among said fourth numerical set in said fourth computing phase, and said first output value and said second output value are included among said fifth numerical set in said fourth computing phase.

38. The system of claim 34, wherein said first process module, said second process module, and said third process module are formed of said first process element and each has the same amounts of said first process element to said fourth process module respectively, wherein said first process element has the computing abilities listed beneath:

including said first input value and said second input value among said first buffer, said second buffer and said third buffer in said first computing phase, said second computing phase and said third computing phase; and including said first output value and said second output value among said second buffer, said third buffer and said fourth buffer in said first computing phase, said second computing phase and said third computing phase.

39. The system of claim 33, wherein said first process module, said second process module, and said third process module are formed of at least a second process element having the computing abilities listed beneath:

adding a first input value and a second input value to output a first output value, and subtracting said second input value from said first input value and then multiplying by a coefficient to output a second output value; and adding said first input value and a product of said second input value and said coefficient to output said first output value, and subtracting said second input value multiplied by said coefficient from said first input value to output said second output value.

40. The system of claim 39, wherein said first input value and said second input value are included among said first buffer in said first computing phase, among said second buffer in said second computing phase, and among said third buffer in said third computing phase respectively, and said first output value and said second output value are included among said second buffer in said first computing phase, among said third buffer in said second computing phase, and among said fourth buffer in said third computing phase respectively.

* * * * *